United States Patent
Guan

(10) Patent No.: US 9,166,495 B2
(45) Date of Patent: Oct. 20, 2015

(54) WIND POWER CONVERTER

(75) Inventor: Eryong Guan, Beijing (CN)

(73) Assignee: ABB TECHNOLOGY LTD., Zurich (CH)

( * ) Notice: Subject to any disclaimer, the term of this patent is extended or adjusted under 35 U.S.C. 154(b) by 222 days.

(21) Appl. No.: 13/876,541

(22) PCT Filed: Jun. 24, 2011

(86) PCT No.: PCT/CN2011/076274
§ 371 (c)(1),
(2), (4) Date: Mar. 28, 2013

(87) PCT Pub. No.: WO2012/174737
PCT Pub. Date: Dec. 27, 2012

(65) Prior Publication Data
US 2013/0182468 A1    Jul. 18, 2013

(51) Int. Cl.
*H02M 5/45* (2006.01)
*H02M 5/458* (2006.01)
*H02J 3/38* (2006.01)

(52) U.S. Cl.
CPC ............. *H02M 5/4585* (2013.01); *H02J 3/386* (2013.01); *Y02E 10/763* (2013.01)

(58) Field of Classification Search
CPC .............................. H02M 5/4585; H02J 3/386
USPC .............................. 363/37, 67, 71; 307/18–22
See application file for complete search history.

(56) References Cited

U.S. PATENT DOCUMENTS

| 7,696,639 B2 * | 4/2010 | Lubomirsky ................... 307/18 |
| 8,427,846 B2 * | 4/2013 | Rexilius ......................... 363/17 |

(Continued)

FOREIGN PATENT DOCUMENTS

| CN | 101123352 A | 2/2008 |
| CN | 101197547 A | 6/2008 |

(Continued)

OTHER PUBLICATIONS

ISA/CN International Search Report re PCT Application No. PCT/CN2011/076274, Dated Mar. 29, 2012.

*Primary Examiner* — Jue Zhang
(74) *Attorney, Agent, or Firm* — Robert A. Jefferis; Driggs, Hogg, Daugherty & Del Zoppo Co., LPA

(57) ABSTRACT

A wind power converter includes a multiple of phase power converters, each of which being adapted to convert power output from a corresponding phase of a wind generator to a corresponding phase of a grid. Each of the phase power converters includes a full-wave rectifier, being adapted to rectify the power input through a first terminal and a second terminal from the corresponding phase of the wind generator; a capacitor being adapted to be charged by the power rectified by the full-wave rectifier; and a full-wave active inverter, being adapted to invert the power stored in the capacitor and output the inverted power to the corresponding phase of the grid through a third terminal and a fourth terminal. The first terminal or the second terminal is connected to a first virtual neutral; and the third terminal or the fourth terminal is connected to a second virtual neutral. By having such topology, each phase power converter serves as a power conversion module independent of the others. Thus, the electrical coupling between any two of the phase power converter is removed. The details of the phase power converter will be described thereafter. It is therefore an objective of the invention to decrease the cost and at the same increase the feeding electrical power quality.

11 Claims, 11 Drawing Sheets

(56) References Cited

U.S. PATENT DOCUMENTS

2002/0080632 A1* 6/2002 Haga et al. .............. 363/65
2009/0147549 A1* 6/2009 Jones et al. .............. 307/19

FOREIGN PATENT DOCUMENTS

| | | |
|---|---|---|
| JP | 2006141162 A | 6/2006 |
| JP | 2006262583 A | 9/2006 |

* cited by examiner

WIND POWER CONVERTER

RELATED APPLICATION

This application is a national filing of PCT application Serial No. PCT/CN2011/076274, filed Jun. 24, 2011.

TECHNICAL FIELD

The invention relates to the field of wind power converter, and more particularly to a multi-phase medium voltage wind power converter.

BACKGROUND ART

Wind power converter typically utilizes AC-DC-AC conversion technology, wherein a voltage or current DC-link is employed.

FIG. 1 illustrates a theoretical topology of a conventional wind power converter with voltage DC-link. According to FIG. 1, the wind power converter 1 includes a wind generator 10, a wind power converter 11 and power grid 12. The wind power converter 11 converts the electrical power generated by the wind generator 10 and feed the converted electrical power to the power grid 12. The wind power converter 11 further includes a three-phase two-level rectifier 110, a DC-link capacitor 111 and a three-phase inverter 112. The three-phase two-level rectifier 110 comprises six diodes D1 to D6, and each of the diodes is connected with a power switch in anti-parallel. The three-phase inverter 112 includes six power switches S1 to S6. Theoretically, the value of the breakdown voltage of each of the diodes in the three-phase two-level rectifier or each of the power switches in the three-phase inverter 112 shall be at least above the value of the voltage across the DC-link capacitor 111. The higher is the value of the output voltage to the power grid desired, the higher is the value of the breakdown voltage is required. As with breakdown voltage increasing the semiconductor cost drastically increases, thus it incurs a higher cost.

From the perspective of engineering, the skilled person shall consider a compromise between the value of the breakdown voltage and the output voltage to the power grid as well as the feeding electrical power quality. FIG. 2 illustrates a conventional wind power converter with voltage DC-link, 3-level neural point clamp topology (3-level1 NPC). According to FIG. 2, the wind power converter 2 includes a wind generator 20, a wind power converter 21 and power grid 22. The wind power converter 21 converts the electrical power generated by the wind generator 20 and feed the converted electrical power to the power grid 22. The wind power converter 21 further includes a three-phase three-level rectifier 210, two DC-link capacitors connected in series 211 and a three-phase three-level inverter 212. The three-phase three-level converter 210 comprises twelve diodes D1 to D12, and each of the diodes is connected with a power switches in anti-parallel; additional diodes Da to Df are coupled as shown FIG. 2. The three-phase inverter 212 includes twelve power switches S1 to S12, and Dg to Dl are coupled as shown FIG. 2. By having such configuration, the value of the breakdown voltage for the diode or the power switch may be at least above the voltage across either of the DC-link capacitor. The required value of the breakdown voltage is reduced, but the number of the power semiconductor is increased, thus the cost reduction brought by the former is mitigated by the cost increase brought by the latter in some degree. If for higher voltage, the issue of semiconductor cost comes out likewise.

In addition, the topology also becomes complex, increasing the coupling among the power devices in the wind power converter.

BRIEF SUMMARY OF THE INVENTION

It is therefore an objective of the invention to decrease the cost and at the same increase the feeding electrical power quality.

According to an embodiment of the invention, a wind power converter comprises: a multiple of phase power converters, each of which being adapted to convert power output from a corresponding phase of a wind generator to a corresponding phase of a grid; each of the phase power converters comprising: a full-wave rectifier, being adapted to rectify the power input through a first terminal and a second terminal from the corresponding phase of the wind generator; a capacitor being adapted to be charged by the power rectified by the full-wave rectifier; and a full-wave active inverter, being adapted to invert the power stored in the capacitor and output the inverted power to the corresponding phase of the grid through a third terminal and a fourth terminal; wherein: the first terminal or the second terminal is connected to a first virtual neutral; and the third terminal or the fourth terminal is connected to a second virtual neutral. By having such topology, each phase power converter serving as a power conversion module independent on the others, thus the electrical coupling between any two of the phase power converter is removed. The details of the phase power converter will be described thereafter.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
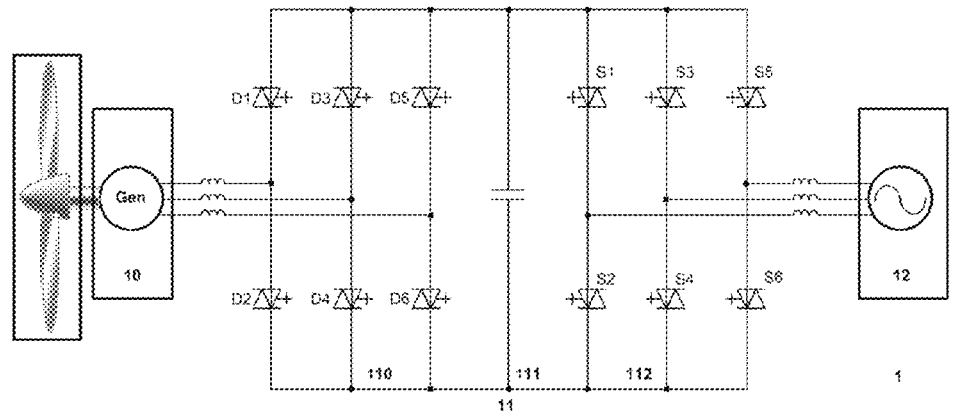
FIG. 1 illustrates a theoretical topology of a conventional wind power converter with voltage DC-link.
Figure 2:
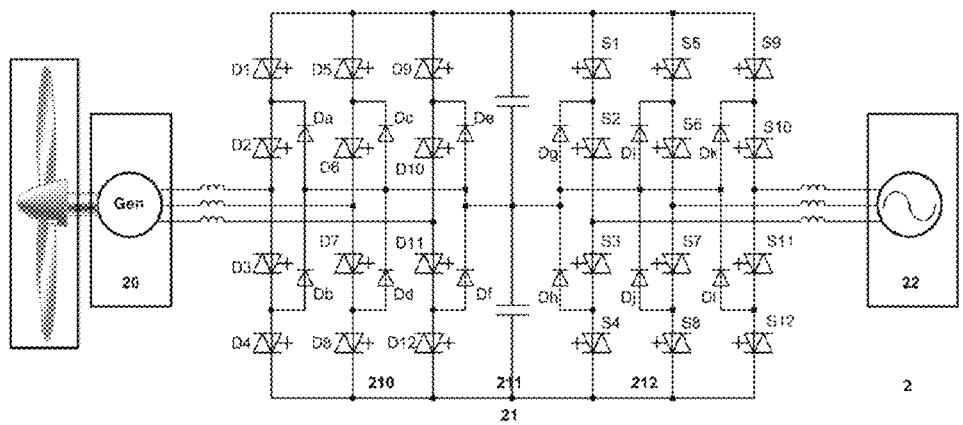
FIG. 2 illustrates a conventional wind power converter with voltage DC-link, 3-level neural point clamp topology (3-level1 NPC)
Figure 3:
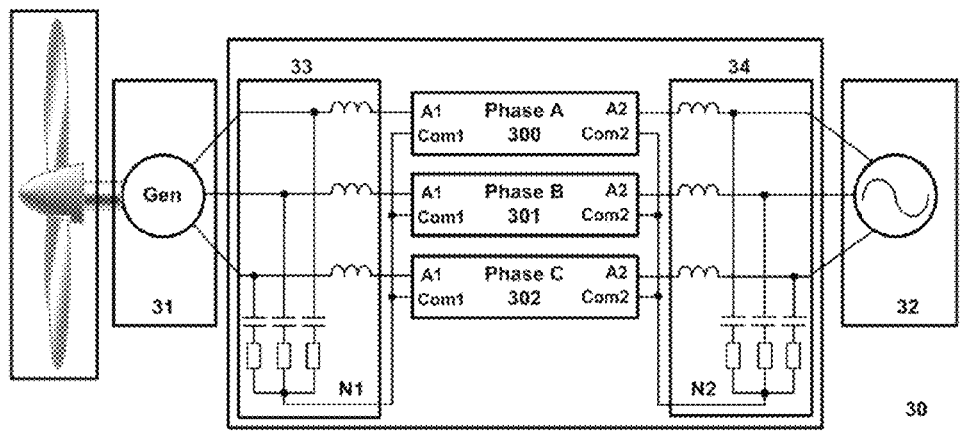
FIG. 3 shows a topology of a wind power converter according to an embodiment of present invention.

FIG. 3 shows a topology of a wind power converter according to an embodiment of present invention. Here, three-phase wind generator is taken as an example for the description of the embodiment. The skilled person shall understand that present invention is also applicable to a multiple-phase wind generator, such as two-phase to more than three-phase. As shown in FIG. 3, the wind power converter 30 comprises phase-A power converter 300, phase-B power converter 301, and phase-C power converter 302. Each of the three phase power converters 300, 301, 302 is adapted to convert power output from a corresponding phase of the wind power generator 31. Each of the phase power converters 300, 301, 302 includes two input terminals A1, Com1, and two output terminals A2, Com2. Input terminals A1 of phase-A power converter 300, phase-B power converter 301, and phase-C power converter 302 are respectively connected with phase-A, phase-B, and phase-C of the wind power generator 31, and terminals Com1 of the three power converters 300, 301, 302 are connected with a first virtual neutral N1. Output terminals A2 of phase-A power converter 300, phase-B power converter 301, and phase-C power converter 302 are respectively connected with phase-A, phase-B, and phase-C of the power grid 32, and terminals Com2 of the three power converters 300, 301, 302 are connected with a second virtual neutral N2. By having such topology, each phase power converter serving as a power conversion module independent on the others, thus the electrical coupling between any two of the phase power converter is removed. The details of the phase power converter will be described thereafter.

Preferably, as shown in FIG. 3, a three-phase filter 33 is linked between the wind generator 31 and the three-phase power converters, and a three-phase filter 34 is linked between the three-phase power converters and the power grid 32.

Figure 4:
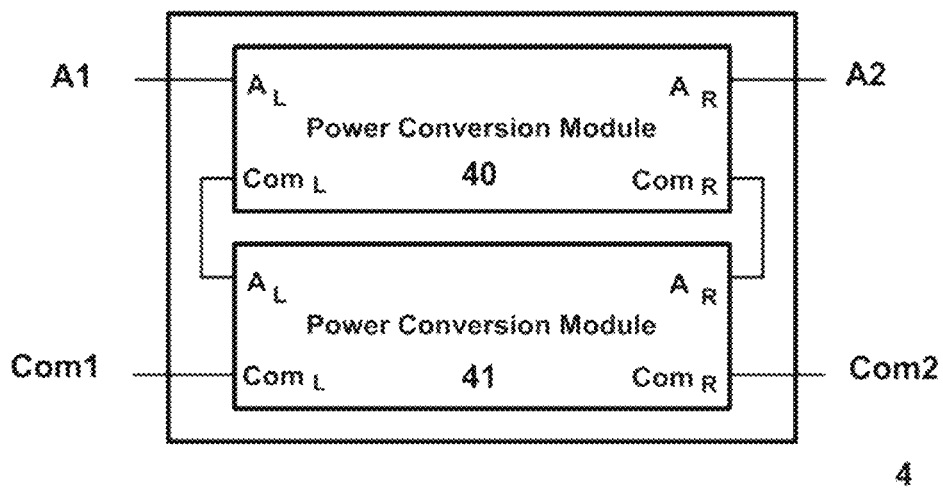
FIG. 4 shows the topology of two power conversion modules linked in cascade according to an embodiment of present invention.
Figure 5:
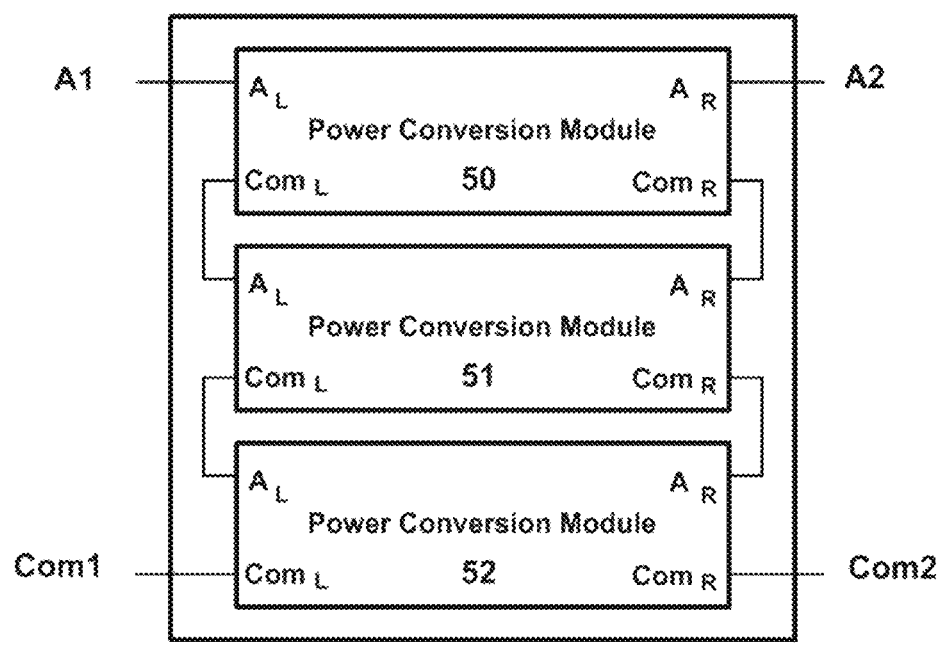
FIG. 5 shows the topology of three power conversion modules linked in cascade according to another embodiment of present invention.

The above phase power converter may be taken as a power conversion module. For the purpose of lowering the required breakdown voltage of the power devices used in the phase power converter, for each of the phases A, B, and C, more than one power conversion module are linked in a cascade. FIG. 4 shows the topology of two power conversion modules linked in cascade according to an embodiment of present invention. As shown in FIG. 4, a phase power converter 4 includes two power conversion modules, the power conversion module 40 and the power conversion module 41 respectively comprise terminals $A_L$, $Com_L$, $A_R$, $Com_R$ as described above. Terminal $Com_L$ of the power conversion module 40 and terminal $A_L$ of the power conversion module 41 are connected, and terminal $Com_R$ of the power conversion module 40 and terminal $A_R$ of the power conversion module 41 are connected. Such linked two modules 40, 41 constitute a phase power converter with terminal $A_L$ of the power conversion module 40 and terminal $Com_L$ of the power conversion module 41 as input terminals for phase power converter 4 (A1 Com1), and terminal $A_R$ of the power conversion module 40 and terminal $Com_R$ of the power conversion module 41 as the output terminals for the phase power converter 4 (A2 Com2). FIG. 5 shows the topology of three power conversion modules linked in cascade according to another embodiment of present invention. As shown in FIG. 5, a phase power converter 5 includes three power conversion modules, the phase power converters 50, 51, 52, respectively comprise terminals $A_L$, $Com_L$, $A_R$, $Com_R$ as described above. Terminal $Com_L$ of the phase power converter 50 and terminal $A_L$ of the phase power converter 51 are connected, terminal $Com_L$ of the phase power converter 51 and terminal $A_L$ of the phase power converter 52 are connected, terminal $Com_R$ of the power conversion module 50 and terminal $A_R$ of the power conversion module 51 are connected, terminal $Com_R$ of the power conversion module 51 and terminal $A_R$ of the power conversion module 52 are connected. Such linked three modules 50, 51, 52 constitute the phase power converter 5 with terminal $A_L$ of the power conversion module 50 and terminal $Com_L$ of the power conversion module 52 as input terminals for phase power converter 5 (A1 Com1), and terminal $A_R$ of the power conversion module 50 and terminal $Com_R$ of the power conversion module 52 as the output terminals for the phase power converter 5 (A2 Com2).

In similar manner as described above, the phase power converter may be extended to even more power conversion modules linked in cascade. For a given voltage across the DC-link capacitor used in the phase power converter, the required value of the breakdown voltage for the power devices used therein will decrease with the extension.

Figure 6:
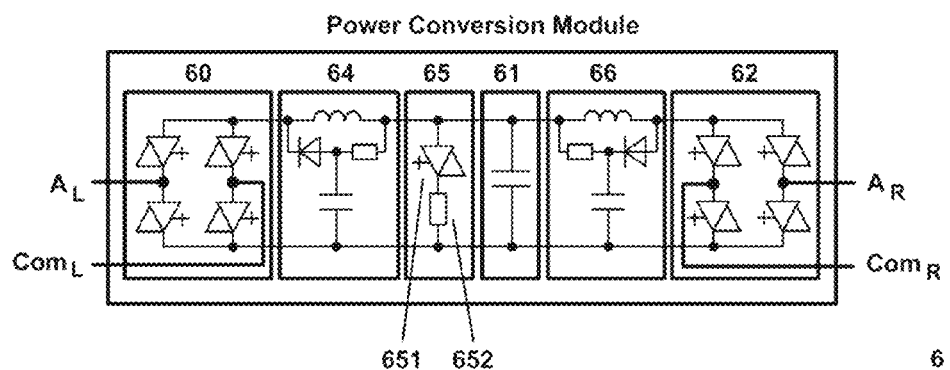
FIG. 6 shows a topology of the power conversion module according to an embodiment of present invention.

FIG. 6 shows a topology of the power conversion module according to an embodiment of present invention. As described previously, a power conversion module, or a plurality of power conversion modules linked in cascade constitute a phase power converter for one phase, phase-A, phase-B or phase-C. As shown in FIG. 6, the power conversion module 6 includes a full-wave rectifier 60 with two input terminals $A_L$ and $Com_L$, a DC-link capacitor 61, and a full-wave active inverter 62 with output terminals $A_R$ and $Com_R$. A wind generator usually generates AC electricity with a variable magnitude and variable frequency. In order to suppress this variability, the full-wave rectifier 60 rectifies the power input through terminals $A_L$ and $Com_L$ from the corresponding phase of the wind generator, such as phase-A, phase-B, or phase-C, the DC-link capacitor 61 is charged by the power rectified by the full-wave rectifier 60, and the full-wave active inverter 62 inverts the power stored in the DC-link capacitor 61 and output the inverted power to the corresponding phase of the power grid through terminals $A_R$ and $Com_R$.

Figure 7:
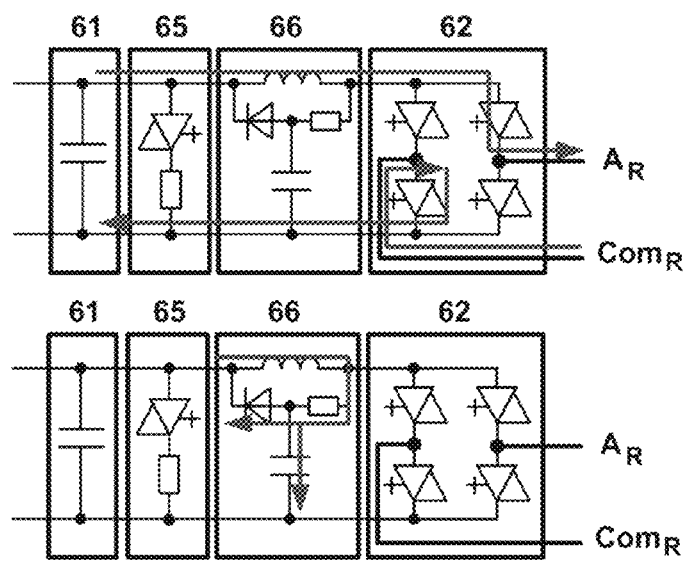
FIG. 7 shows the operation of the clamp circuit between the switched-on state and the switched-off state.
Figure 8:
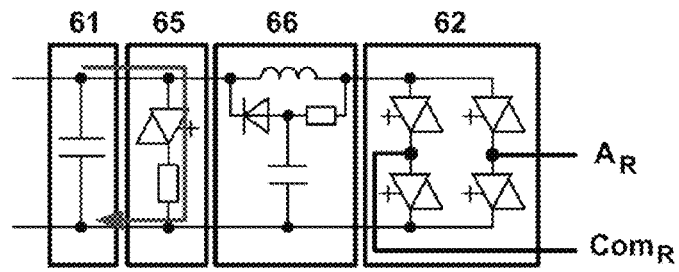
FIG. 8 shows the operation of the unload unit absorbing the electrical power.

Preferably, between the full-wave rectifier 60 and the DC-link capacitor 61 in series are connected a clamp circuit 64 and a unload unit 65, and between the DC-link capacitor 61 and the full-wave active inverter 62 is connected another clamp circuit 66. The clamp circuit includes an inductor, a resistor, a diode, and a capacitor as connected in FIG. 6. The unload unit 65 includes a power device 650 and a resistor 651 as in FIG. 6. The clamp circuit 64, 66 is helpful for releasing the inductance current in the power conversion module on the capacitor and resistor arranged in the clamp circuit 64 when the power switches in the active full-wave rectifier or the full-wave active inverter are switched-off, thus preventing shooting down the power devices in the power conversion module. The unload unit 65 is helpful for absorbing the electrical power input from the wind generator by firing the power device 650 when the power grid dips or DC-link capacitor turns to over-voltage. FIG. 7 shows the operation of the clamp circuit between the switched-on state and the switched-off state. FIG. 8 shows the operation of the unload unit absorbing the electrical power.

Figure 9:
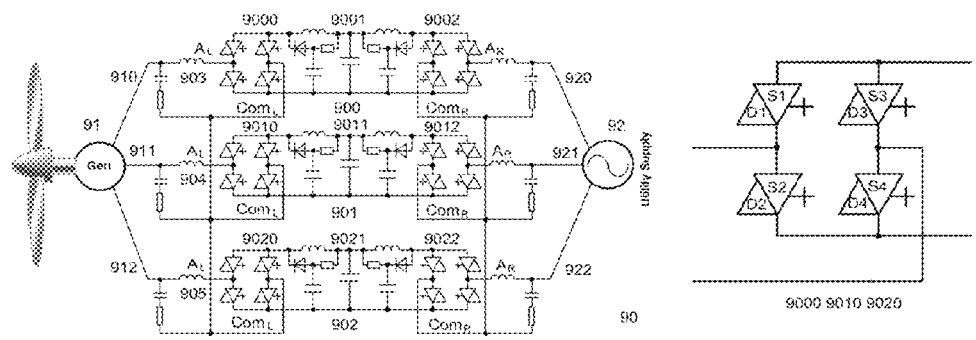
FIG. 9 shows a topology of the wind power converter according to an embodiment of present invention.
Figure 10A:
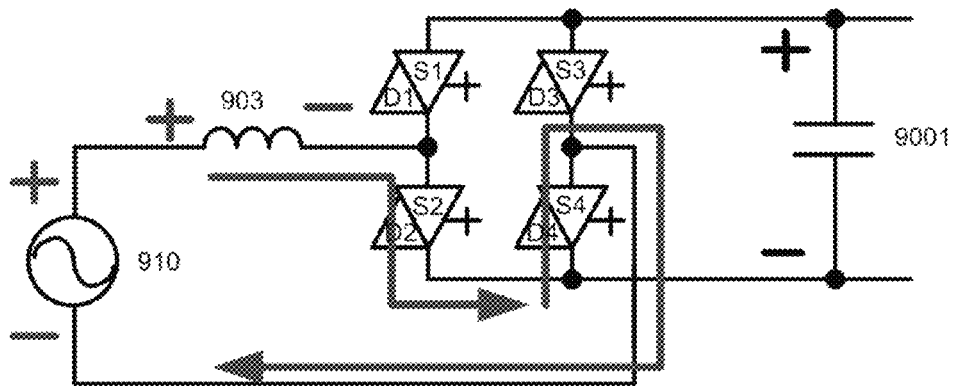
FIG. 10A shows phase-I of boost-mode in which the active full-wave rectifier operates according to an embodiment of present invention.
Figure 10B:
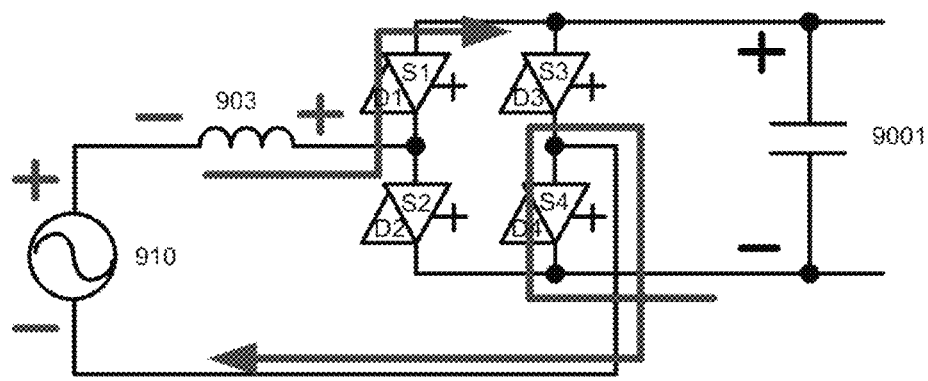
FIG. 10B shows phase-II of boost-mode in which the active full-wave rectifier operates according to an embodiment of present invention.

The magnitude of the voltage of the electrical power fed to the power grid is usually set higher than that of the voltage input to the wind power converter. Therefore, an active full-wave rectifier is preferable to a passive full-wave rectifier for the implementation of the full-wave rectifier 60 as shown in FIG. 6. FIG. 9 shows a topology of the wind power converter according to an embodiment of present invention. The topology according to FIG. 9 is a device-based implementation of the power-conversion-module-based topology as shown in FIG. 3, wherein the phase power converter as in FIG. 3 is embodied by the power conversion module as shown in FIG. 6. The wind power converter 90 includes phase-A power converter 900, phase-B power converter 901, and phase-C power converter 902. Each of the three phase power converters 900, 901, 902 is adapted to convert power output from a corresponding phase of the wind power generator 91. Each of the phase power converters 900, 901, 902 includes two input terminals $A_L$, $Com_L$, and two output terminals $A_R$, $Com_R$. Input terminals $A_L$ of phase-A power converter 900, phase-B power converter 901, and phase-C power converter 902 are respectively connected with phase-A, phase-B, and phase-C of the wind power generator 91, and terminals $Com_L$ of the three power converters 900, 901, 902 are connected with a first virtual neutral N1. Output terminals $A_R$ of phase-A power converter 900, phase-B power converter 901, and phase-C power converter 902 are respectively connected with phase-A, phase-B, and phase-C of the power grid 92, and terminals $Com_R$ of the three power converters 900, 901, 902 are connected with a second virtual neutral N2. By having such topology, each phase power converter serving as a power conversion module independent on the others, thus the electrical coupling between any two of the phase power converter is removed. The phase power converter 900, 901, 902 includes an active full-wave rectifier 9000, 9010, 9020 with two input terminals $A_L$ and $Com_L$, a DC-link capacitor 9001, 9011, 9021, and a full-wave active inverter 9002, 9012, 9022 with output terminals $A_R$ and $Com_R$. The full-wave rectifier 9000, 9010, 9020 rectifies the power input through terminals $A_L$ and $Com_L$ from the corresponding phase of the wind generator, such as phase-A, phase-B, or phase-C. The DC-link capacitor 910, 911, 912 is charged by the power rectified by the full-wave rectifier 9000, 9010, 9020. The full-wave active inverter 9002, 9012, 9022 inverts the power stored in the DC-link capacitor 9001, 9011, 9021 and output the inverted power to the corresponding phase of the power grid through terminals $A_R$ and $Com_R$. The wind power converter 90 further includes phase-A inductor 903, phase-B inductor 904, and phase-C inductor 905 respectively connected between the phase-A power converter 900, phase-B power converter 901, and phase-C power converter 902 and phase-A 910, phase-B 911, and phase-C 912 of the wind generator 91. As shown in FIG. 9, the full-wave active rectifier 9000, 9010, 9020 comprises four diodes D1 to D4 and four power switches S1 to S4, and the diode D1, D2, D3, D4 and the power switch S1, S2, S3, S4 are connected in anti-parallel. In order to raise the value of the voltage across the DC-link capacitor 9001, 9011, 9021, the active full-wave rectifier 9000, 9010, 9020 operates in boost-mode as shown in FIGS. 10A and 10B. The key principle that drives the boost-mode is the tendency of an inductor to resist changes in current. When being charged it acts as a load and absorbs energy (somewhat like a resistor), when being discharged, it acts as an energy source (somewhat like a battery). The voltage it produces during the discharge phase is related to the rate of change of current, and not to the original charging voltage, thus allowing different input and output voltages.

FIG. 10A shows phase-I of boost-mode in which the active full-wave rectifier operates according to an embodiment of present invention. Here, single-phase-A full-wave rectifier is taken as an example for the description of the embodiment. The skilled person shall understand that present invention is also applicable to the three-phase full-wave rectifier. As shown in FIG. 10A, in terms of the positive cycle of the electrical power from the wind generator 910, in the phase-I of the boost mode, the power switch S2 is closed while the other power switches S1, S3, S4 are open and diode D4 is on, resulting in an increase in the current of phase-A inductor 903, so that the phase inductor is charged by the power output from the corresponding phase of the wind generator 910. In terms of the negative cycle of the electrical power from the wind generator 910 (not shown), in the phase-I of the boost mode, the power switch S1 is closed while the other power switches S2, S3, S4 are open and diode D3 is on with the same result of charging the phase inductor. The skilled person shall understand that alternative current path for phase-I of boost mode may be achieved with one of the power switches is close and the other power switches are open, for example, in terms of the positive cycle of the electrical power from the wind generator 910, the power switch S3 is closed while the other power switches S1, S2, S4 are open and diode D1 is on; in terms of the negative cycle of the electrical power from the wind generator 910, the power switch S1 is closed while the other power switches S2, S3, S4 are open and diode D3 is on; or in terms of the negative cycle of the electrical power from the wind generator 910, the power switch S4 is closed while the other power switches S1, S2, S3 are open and diode D2 is on (not shown).

FIG. 10B shows phase-II of boost-mode in which the active full-wave rectifier operates according to an embodiment of present invention. As shown in FIG. 10B, in terms of the positive cycle of the electrical power from the wind generator 910, in the phase-II of the boost mode, all of the power switches are open and the only path offered to the phase inductor current is through the diodes D1, D4, the DC-link capacitor 9001. This results in transferring the energy accumulated during the phase-I into the DC-link capacitor 9001. In terms of the negative cycle of the electrical power from the wind generator 910, in the phase-II of the boost mode, the power switch S1 is open and the only path offered to the phase inductor current is through the diodes D2, D3, the DC-link capacitor 9001. This results in transferring the energy accumulated during the phase-I into the DC-link capacitor 9001. In terms of the negative cycle of the electrical power from the wind generator 910, in the phase-II of the boost mode, the power switch S1, S4 is open and the only path offered to the phase inductor current is through the diodes D3, D2, the DC-link capacitor 9001 (not shown).

From the above description it can be seen that the output voltage to the DC-link capacitor is always higher than the input voltage from the wind generator.

Preferably, between the full-wave rectifier 9000 and the DC-link capacitor 9001 in series are connected a clamp circuit.

The skilled person should understand that the active full-wave rectifier may operate in a diode mode, wherein none of the power switches is close. In the diode-mode, the active full-wave rectifier equals to a passive full-wave rectifier in functionality. The corresponding DC-link capacitor is charged by the power output from the corresponding phase of the wind generator (without the phase inductor) or by the power output from the corresponding phase of the wind generator and the power stored in the corresponding phase inductor (with the phase inductor).

Figure 11:
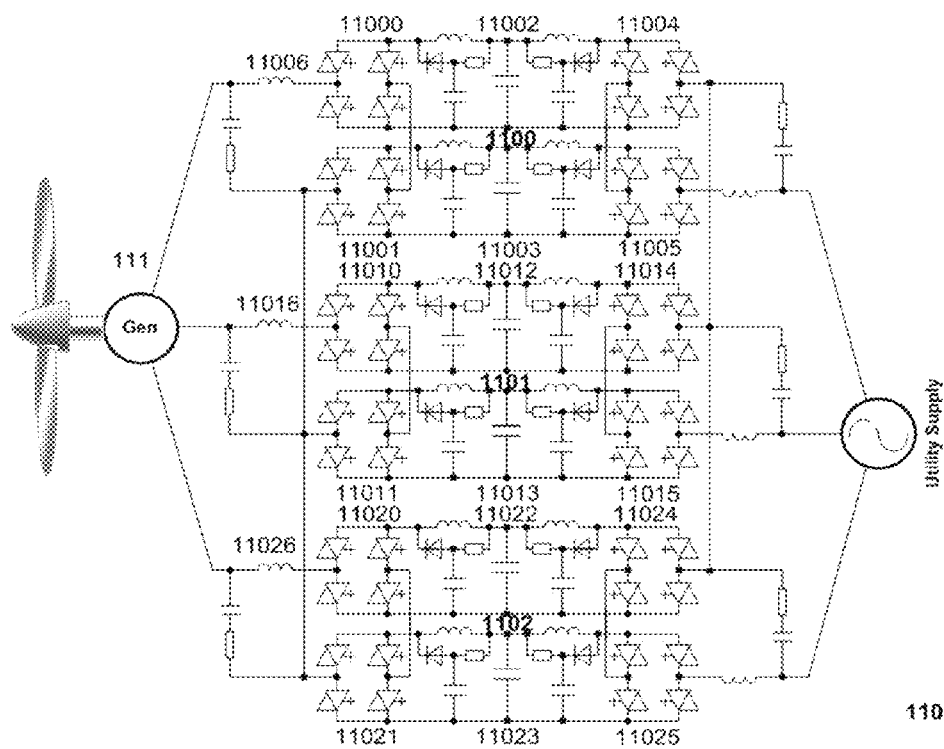
FIGS. 11 and 12 respectively show device-based implementation of the power-conversion-module-based topology according to FIGS. 4 and 5.
Figure 12:
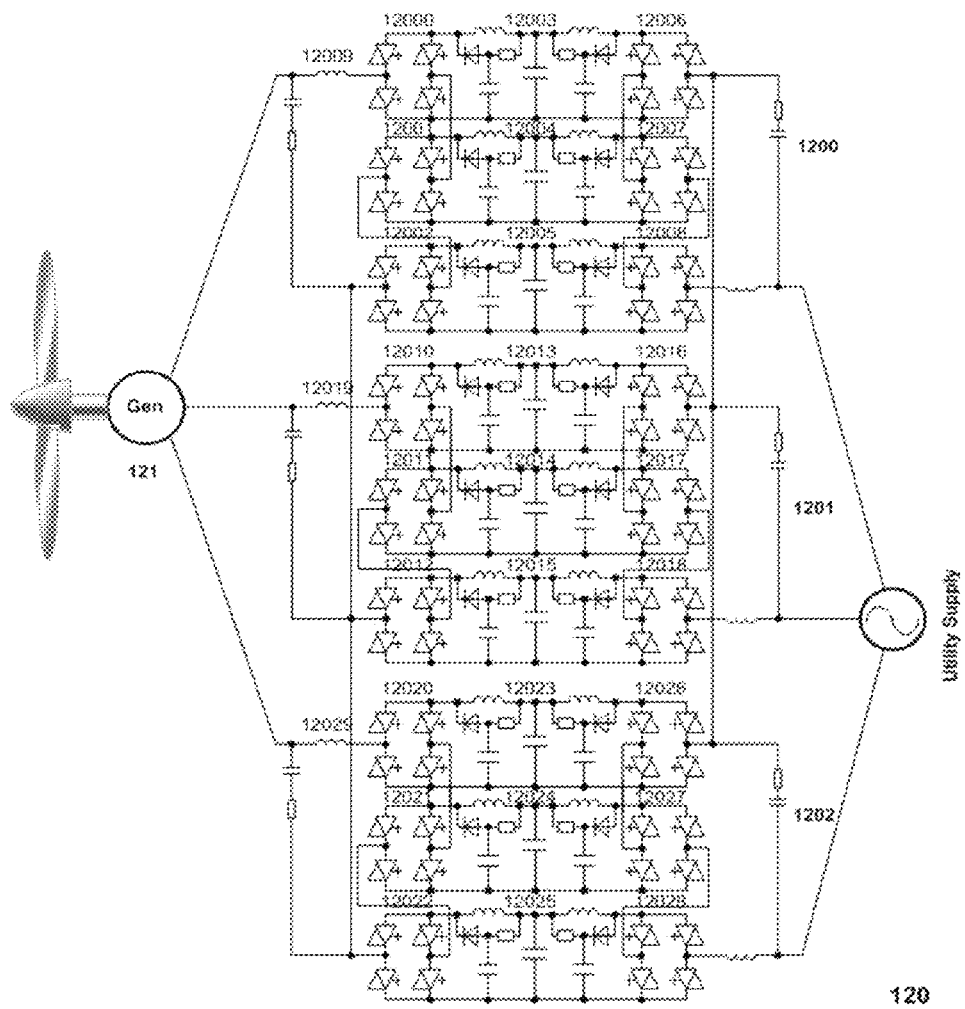

FIGS. 11 and 12 respectively show device-based implementation of the power-conversion-module-based topology according to FIGS. 4 and 5.

As shown in FIG. 11, a wind power converter 110 includes three phase power converter respectively for phase-A, phase-B and phase-C 1100, 1101, 1102, each of which further includes two power conversion modules, the first power conversion module and the second power conversion module respectively comprise terminals $A_L$, $Com_L$, $A_R$, $Com_R$ as described above. Terminal $Com_L$ of the first power conversion module and terminal $A_L$ of the second power conversion module are connected, and terminal $Com_R$ of the first power conversion module and terminal $A_R$ of the second power conversion module are connected. Such linked two modules constitute a phase power converter with terminal $A_L$ of the first power conversion module and terminal $Com_L$ of the second power conversion module as input terminals for phase power converter 1100, 1101, 1102, and terminal $A_R$ of the first power conversion module and terminal $Com_R$ of the second power conversion module as the output terminals for the phase power converter 1100, 1101, 1102. As shown in FIG. 11, from the perspective of functionality, each of the three phase power converter 1100, 1101, 1102 includes a full-wave active rectifier, a DC link capacitor and a full-wave active inverter. The full-wave active rectifier of phase-A power converter further comprises two sub-full-wave active rectifiers 11000, 11001 connected in cascade, the full-wave active rectifier of phase-B power converter further comprises two sub-full-wave active rectifiers 11010, 11011 connected in cascade, and the full-wave active rectifier of phase-C power converter further comprises two sub-full-wave active rectifiers 11020, 11021 connected in cascade. The DC-link capacitor for phase-A power converter comprises two sub-capacitors 11002, 11003 is charged by the power rectified by the corresponding sub-full-wave-active rectifier 11000, 11001, the DC-link capacitor for phase-B power converter comprises two sub-capacitors 11012, 11013 is charged by the power rectified by the corresponding sub-full-wave-active rectifier 11010, 11011, and the DC-link capacitor for phase-C power converter comprises two sub-capacitors 11022, 11023 is charged by the power rectified by the corresponding sub-full-wave-active rectifier 11020, 11021. The full-wave active inverter for phase-A comprises two sub-full-wave active inverters 11004, 11005 in a cascade, wherein each of the sub-full-wave active inverters comprises four diodes and four power switches, the full-wave active inverter for phase-B comprises two sub-full-wave active inverters 11014, 11015 in a cascade, wherein each of the sub-full-wave active inverters comprises four diodes and four power switches, and the full-wave active inverter for phase-C comprises two sub-full-wave active inverters 11024, 11025 in a cascade, wherein each of the sub-full-wave active inverters comprises four diodes and four power switches. Between the wind generator 111 and each of the phase-A, phase-B, phase-C power converters, are connected phase-A inductor, phase-B inductor, phase-C inductor 11006, 11016, 11026, which are helpful for boosting the voltage applied to the DC-link capacitors and for filtering.

For the purpose of clarity and concise, taking phase-A as an example since phase-A, phase-B and phase-C share similar topology. In order to raise the value of the voltage across the sub-capacitors 11002, 11003, the sub-full-wave active rectifiers 11000, 11001 operate in boost-mode as shown in FIGS. 13A and 13B.

Figure 13A:
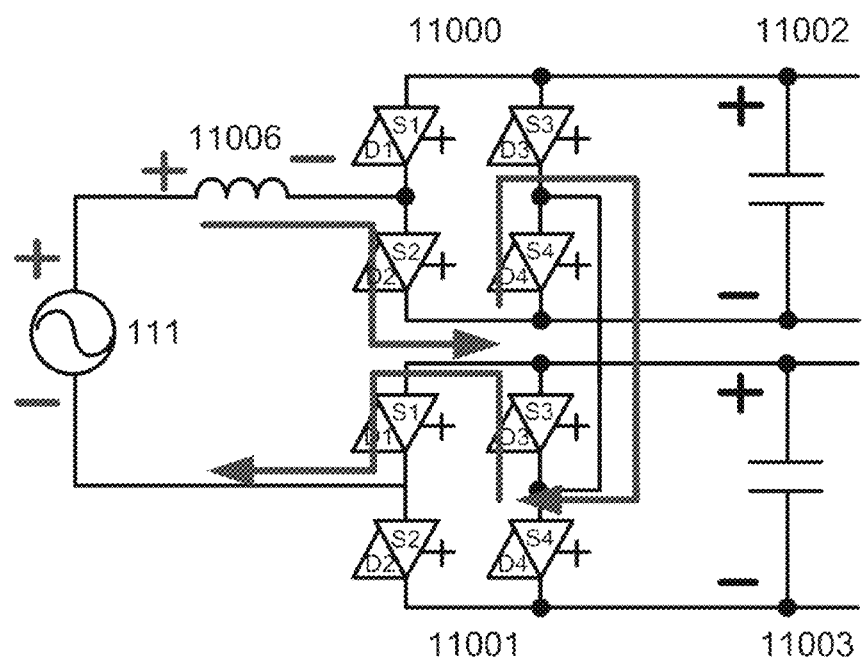
FIG. 13A shows phase-I of boost-mode in which the active full-wave rectifier operates according to an embodiment of present invention.

FIG. 13A shows phase-I of boost-mode in which the active full-wave rectifier operates according to an embodiment of present invention. As shown in FIG. 13A, in terms of the positive cycle of the electrical power from the wind generator, in the phase-I of the boost mode, the power switch S2 is closed while the other power switches S1, S3, S4 are open and diode D4 is on in sub-full-wave active rectifiers 11000, and the power switch S3 is closed while the other power switches S1, S2, S4 are open and diode D1 is on in sub-full-wave active rectifiers 11001, resulting in an increase in the current of phase-A inductor 11006, so that the phase inductor is charged by the power output from the corresponding phase of the wind generator 111. In terms of the negative cycle of the electrical power from the wind generator 111, in the phase-I of the boost mode, the power switch S1 is closed while the other power switches S2, S3, S4 are open and diode D3 is on in sub-full-wave active rectifiers 11000, and the power switch S2 is closed while the other power switches S1, S3, S4 are open and diode D4 is on in sub-full-wave active rectifiers 11001 with the same result of charging the phase-A inductor 11006. The skilled person shall understand that alternative current path for phase-I of boost mode may be achieved with one of the power switches is close and the other power switches are open, for example, in terms of the positive cycle of the electrical power from the wind generator, in the phase-I of the boost mode, the power switch S1 is closed while the other power switches S2, S3, S4 are open and diode D3 is on in sub-full-wave active rectifiers 11000, and the power switch S4 is closed while the other power switches S1, S2, S3 are open and diode D2 is on in sub-full-wave active rectifiers 11001; in terms of the negative cycle of the electrical power from the wind generator, in the phase-I of the boost mode, the power switch S3 is closed while the other power switches S2, S3, S4 are open and diode D1 is on in sub-full-wave active rectifiers 11001, and the power switch S4 is closed while the other power switches S1, S2, S3 are open and diode D2 is on in sub-full-wave active rectifiers 11002; or in terms of the negative cycle of the electrical power from the wind generator, in the phase-I of the boost mode, the power switch S2 is closed while the other power switches S1, S3, S4 are open and diode D4 is on in sub-full-wave active rectifiers 11001, and the power switch S3 is closed while the other power switches S1, S2, S4 are open and diode D1 is on in sub-full-wave active rectifiers 11000 (not shown).

Figure 13B:
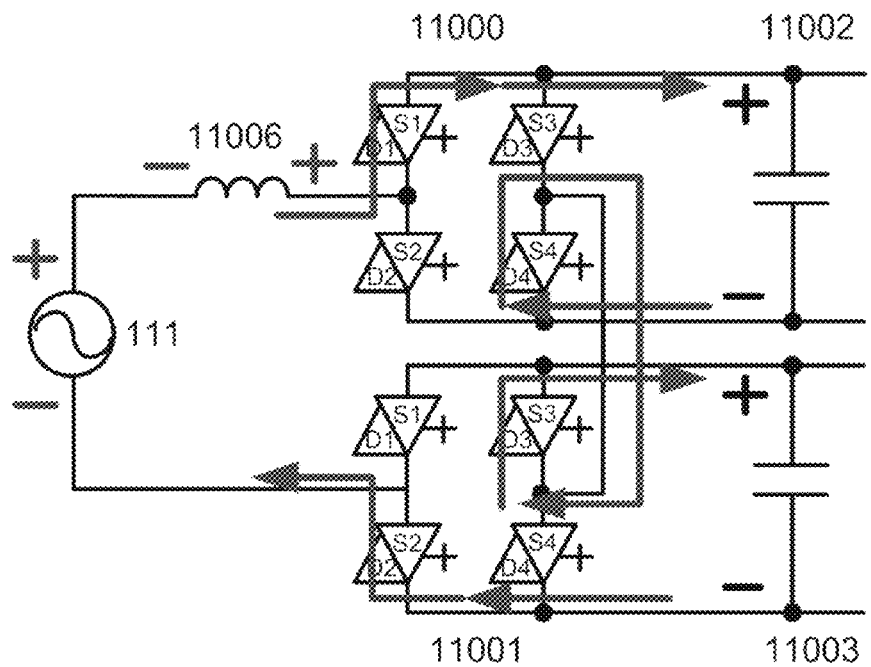
FIG. 13B shows phase-II of boost-mode in which the active full-wave rectifier operates according to an embodiment of present invention.

FIG. 13B shows phase-II of boost-mode in which the active full-wave rectifier operates according to an embodiment of present invention. As shown in FIG. 13B, in terms of the positive cycle of the electrical power from the wind generator 111, in the phase-II of the boost mode, all of the power switches are open in sub-full-wave active rectifiers 11000 and all the power switches in sub-full-wave active rectifiers 11001 are open, and the only path offered to the phase-A inductor 11006 current is through the diodes D1, D4 in sub-full-wave active rectifiers 11000, the sub-capacitors 11002, the diodes D2, D3 in sub-full-wave active rectifiers 11001 and the sub-capacitors 11003. This results in transferring the energy accumulated during the phase-I into the sub-capacitors 11002, 11003. In terms of the negative cycle of the electrical power from the wind generator 111, in the phase-II of the boost mode, the power switch S1 is open in sub-full-wave active rectifiers 11000 and power switch S2 is open in sub-full-wave active rectifiers 11001, and the only path offered to the phase-A inductor 1103 current is through the diodes D2, D3 in sub-full-wave active rectifiers 11000, the sub-capacitors 11002, the diodes D1, D4 in sub-full-wave active rectifiers 11001 and the sub-capacitors 11003. This results in transferring the energy accumulated during the phase-I into the phase-A DC-link capacitor. The skilled person shall understand that in terms of the negative cycle of the electrical power from the wind generator 111, in the phase-II of the boost mode, all of the power switches are open in sub-full-wave active rectifiers 11000 and all the power switches in sub-full-wave active rectifiers 11001 are open, and the only path offered to the phase-A inductor 11006 current is through the diodes D2, D3 in sub-full-wave active rectifiers 11000, the sub-capacitors 11002, the diodes D1, D4 in sub-full-wave active rectifiers 11001 and the sub-capacitors 11003 (not shown).

Figure 13C:
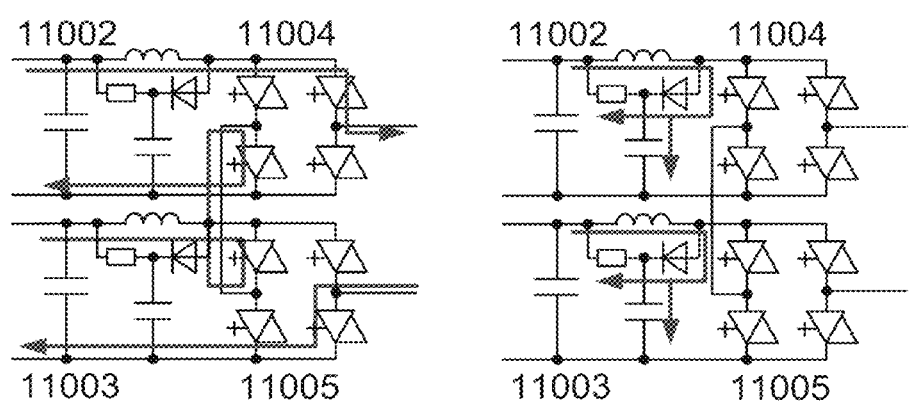
FIG. 13C shows the operation of the full-wave active inverter according to an embodiment of present invention.

Again, phase-A full-wave active inverters 11004, 11005 is taken as an example. FIG. 13C left shows the operation of the full-wave active inverter according to an embodiment of present invention, is how to produce the maximal output. And for other states they are similar with one power conversion module as described above. FIG. 13C right shows the operation of the clamp circuit between the switched-on state and the switched-off state.

In similar manner as described above, the phase power converter may be extended to even more power conversion modules linked in cascade. For a given voltage across the DC-link capacitor used in the phase power converter, the required value of the breakdown voltage for the power devices used therein will decrease with the extension.

As shown in FIG. 12, a wind power converter 120 includes three phase power converter respectively for phase-A, phase-B and phase-C 1200, 1201, 1202, each of which further includes three power conversion modules, the first, second and third power conversion modules respectively comprise terminals $A_L$, $Com_L$, $A_R$, $Com_R$ as described above. Terminal $Com_L$ of the first power conversion module and terminal $A_L$ of the second power conversion module are connected, terminal $Com_L$ of the second power conversion module and terminal $A_L$ of the third power conversion module are connected, terminal $Com_R$ of the first power conversion module and terminal $A_R$ of the second power conversion module are connected, terminal $Com_R$ of the second power conversion module and terminal $A_R$ of the third power conversion module are connected. Such linked three modules constitute a phase power converter with terminal $A_L$ of the first power conversion module and terminal $Com_L$ of the third power conversion module as input terminals for phase power converter 1200, 1201, 1202, and terminal $A_R$ of the first power conversion module and terminal $Com_R$ of the third power conversion module as the output terminals for the phase power converter 1200, 1201, 1202. As shown in FIG. 12, from the perspective of functionality, each of the three phase power converter 1200, 1201, 1202 includes a full-wave active rectifier, a DC link capacitor and a full-wave active inverter. The full-wave active rectifier of phase-A power converter further comprises three sub-full-wave active rectifiers 12000, 12001, 12002 connected in cascade, the full-wave active rectifier of phase-B power converter further comprises three sub-full-wave active rectifiers 12010, 12011, 12012 connected in cascade, and the full-wave active rectifier of phase-C power converter further comprises three sub-full-wave active rectifiers 12020, 12021, 12022 connected in cascade. The DC-link capacitor for phase-A power converter comprises three sub-capacitors 12003, 12004, 12005 is charged by the power rectified by the corresponding sub-full-wave-active rectifier 12000, 12001, 12002, the DC-link capacitor for phase-B power converter comprises three sub-capacitors 12013, 12014, 12015 is charged by the power rectified by the corresponding sub-full-wave-active rectifier 12010, 12011, 12012, and the DC-link capacitor for phase-C power converter comprises three sub-capacitors 12023, 12024, 12025 is charged by the power rectified by the corresponding sub-full-wave-active rectifier 12020, 12021, 12022. The full-wave active inverter for phase-A comprises three sub-full-wave active inverters 12006, 12007, 12008 in a cascade, wherein each of the sub-full-wave active inverters comprises four diodes and four power switches, the full-wave active inverter for phase-B comprises three sub-full-wave active inverters 12016, 12017, 12018 in a cascade, wherein each of the sub-full-wave active inverters comprises four diodes and four power switches, and the full-wave active inverter for phase-C comprises three sub-full-wave active inverters 12026, 12027, 12028 in a cascade, wherein each of the sub-full-wave active inverters comprises four diodes and four power switches. Between the wind generator 121 and each of the phase-A, phase-B, phase-C power converters, are connected phase-A inductor, phase-B inductor, phase-C inductor 12009, 12019, 12029, which are helpful for boosting the voltage applied to the DC-link capacitors and for filtering.

For the purpose of clarity and concise, taking phase-A as an example since phase-A, phase-B and phase-C share similar topology. In order to raise the value of the voltage across the sub-capacitors 12003, 12004, 12005, the sub-full-wave active rectifiers 12000, 12001, 12002 operate in boost-mode as shown in FIGS. 14A and 14B.

Figure 14A:
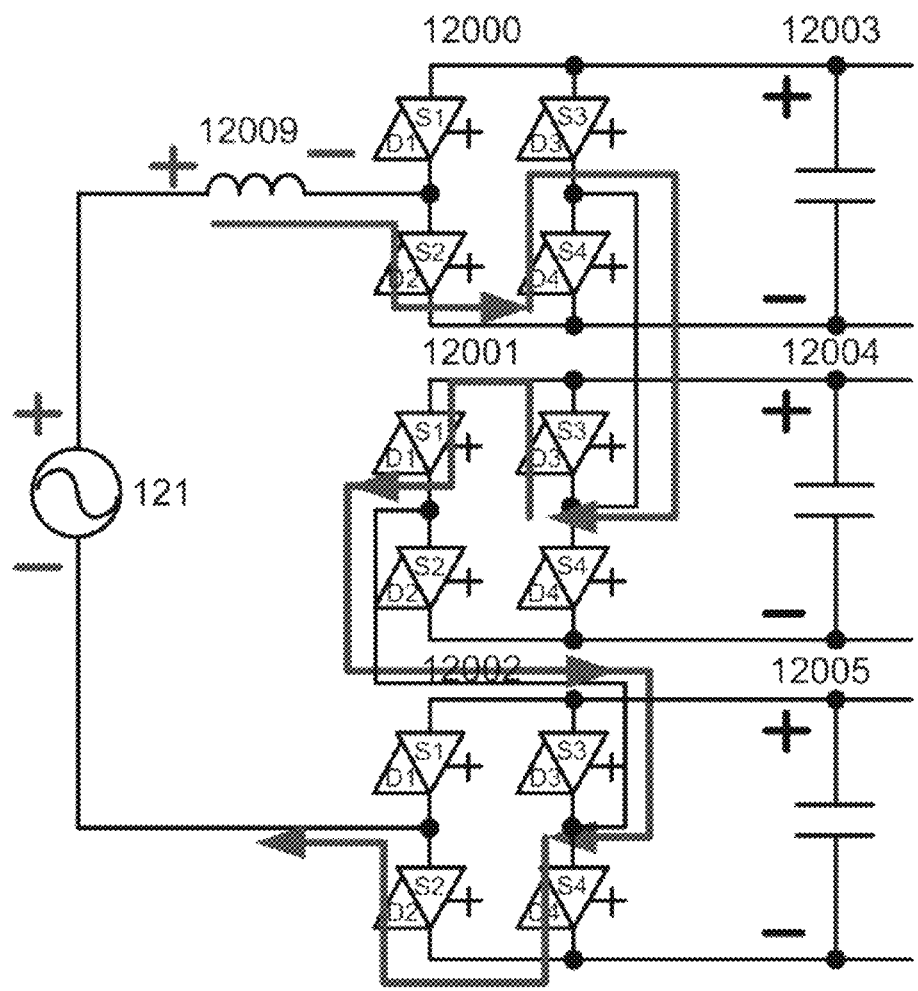
FIG. 14A shows phase-I of boost-mode in which the active full-wave rectifier operates according to an embodiment of present invention.

FIG. 14A shows phase-I of boost-mode in which the active full-wave rectifier operates according to an embodiment of present invention. As shown in FIG. 14A, in terms of the positive cycle of the electrical power from the wind generator, in the phase-I of the boost mode, the power switch S2 is closed while the other power switches S1, S3, S4 are open and diode D4 is on in sub-full-wave active rectifiers 12000, the power switch S1 is closed while the other power switches S2, S3, S4 are open and diode D3 is on in sub-full-wave active rectifiers 12001, and the power switch S4 is closed while the other power switches S1, S2, S3 are open and diode D2 is on in sub-full-wave active rectifiers 12002, resulting in an increase in the current of phase-A inductor 12009, so that the phase inductor is charged by the power output from the corresponding phase of the wind generator 121. In terms of the negative cycle of the electrical power from the wind generator 121, in the phase-I of the boost mode, the power switch S1 is closed while the other power switches S2, S3, S4 are open and diode D3 is on in sub-full-wave active rectifiers 12000, the power switch S2 is closed while the other power switches S1, S3, S4 are open and diode D4 is on in sub-full-wave active rectifiers 12001, and the power switch S3 is closed while the other power switches S1, S2, S4 are open and diode D1 is on in sub-full-wave active rectifiers 12002 with the same result of charging the phase-A inductor 12009. The skilled person shall understand that alternative current path for phase-I of boost mode may be achieved with one of the power switches is close and the other power switches are open, for example, in terms of the positive cycle of the electrical power from the wind generator, in the phase-I of the boost mode, the power switch S3 is closed while the other power switches S1, S2, S4 are open and diode D1 is on in sub-full-wave active rectifiers 12000, the power switch S4 is closed while the other power switches S1, S2, S3 are open and diode D2 is on in sub-full-wave active rectifiers 12001, and the power switch S1 is closed while the other power switches S2, S3, S4 are open and diode D3 is on in sub-full-wave active rectifiers 12002; in terms of the negative cycle of the electrical power from the wind generator, in the phase-I of the boost mode, the power switch S3 is closed while the other power switches S1, S2, S4 are open and diode D1 is on in sub-full-wave active rectifiers 12002, the power switch S2 is closed while the other power switches S1, S3, S4 are open and diode D4 is on in sub-full-wave active rectifiers 12001, and the power switch S1 is closed while the other power switches S2, S3, S4 are open and diode D3 is on in sub-full-wave active rectifiers 12000; or in terms of the negative cycle of the electrical power from the wind generator, in the phase-I of the boost mode, the power switch S2 is closed while the other power switches S1, S3, S4 are open and diode D4 is on in sub-full-wave active rectifiers 12002, the power switch S2 is closed while the other power switches S1, S3, S4 are open and diode D4 is on in sub-full-wave active rectifiers 12001, and the power switch S1 is closed while the other power switches S2, S3, S4 are open and diode D3 is on in sub-full-wave active rectifiers 12000 (not shown).

Figure 14B:
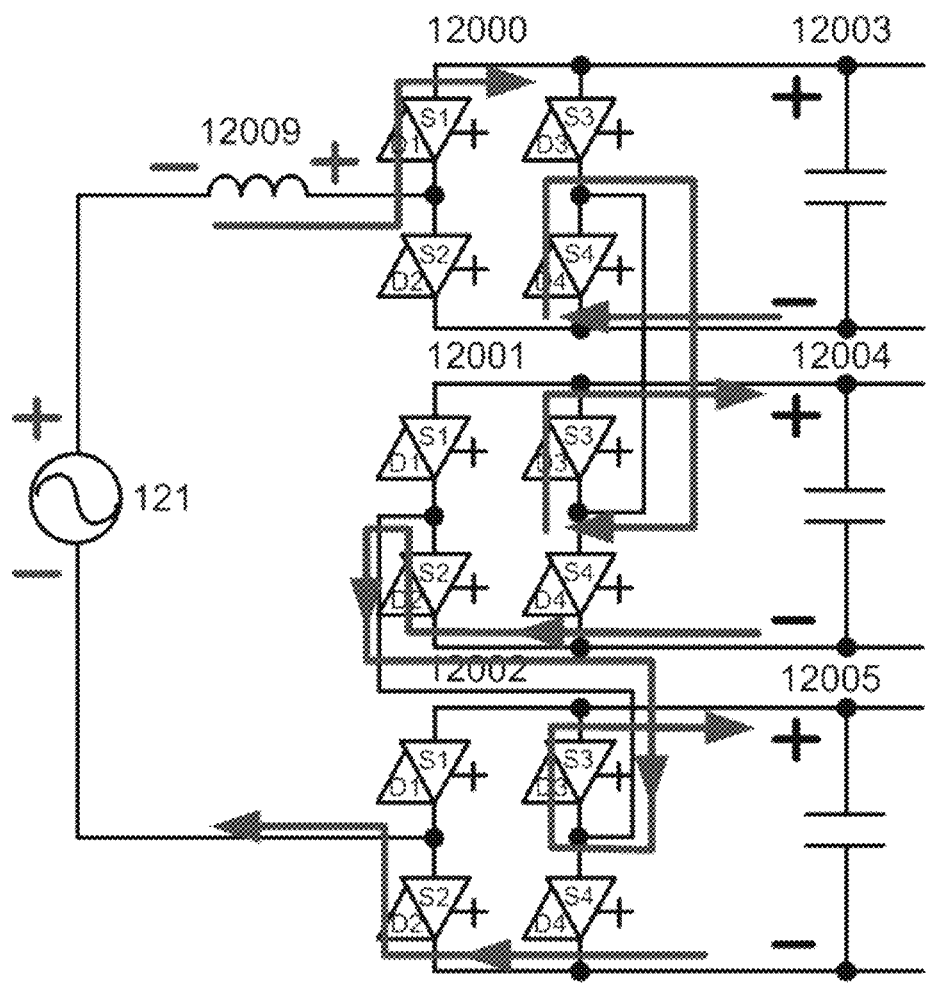
FIG. 14B shows phase-II of boost-mode in which the active full-wave rectifier operates according to an embodiment of present invention.

FIG. 14B shows phase-II of boost-mode in which the active full-wave rectifier operates according to an embodiment of present invention. As shown in FIG. 14B, in terms of the positive cycle of the electrical power from the wind generator 121, in the phase-II of the boost mode, the power switch S2 is open in sub-full-wave active rectifiers 12000, the power switch S1 is open in sub-full-wave active rectifiers 12001, and the power switch S4 is open in sub-full-wave active rectifiers 12002, and the only path offered to the phase-A inductor 12009 current is through the diodes D1, D4 in sub-full-wave active rectifiers 12000, the sub-capacitors 12003, diodes D2, D3 in sub-full-wave active rectifiers 12001, the sub-capacitors 12004, diodes D2, D3 in sub-full-wave active rectifiers 12002, the sub-capacitors 12005. This results in transferring the energy accumulated during the phase-I into the sub-capacitors 12003, 12004, 12005. In terms of the negative cycle of the electrical power from the wind generator 121, in the phase-II of the boost mode, the power switch S1 is open in sub-full-wave active rectifiers 12000, the power switch S2 is open in sub-full-wave active rectifiers 12001, and the power switch S3 is open in sub-full-wave active rectifiers 12002, and the only path offered to the phase-A inductor 12009 current is through the diodes D2, D3 in sub-full-wave active rectifiers 12000, the sub-capacitors 12003, diodes D1, D4 in sub-full-wave active rectifiers 12001, the sub-capacitors 12004, diodes D1, D4 in sub-full-wave active rectifiers 12002, the sub-capacitors 12005. This results in transferring the energy accumulated during the phase-I into the phase-A DC-link capacitor. The skilled person shall understand that in terms of the negative cycle of the electrical power from the wind generator 121, in the phase-II of the boost mode, all of the power switches are open in sub-full-wave active rectifiers 12000, all of the power switches are open in sub-full-wave active rectifiers 12001, and all of the power switches open in sub-full-wave active rectifiers 12002, and the only path offered to the phase-A inductor 12009 current is through the diodes D1, D4 in sub-full-wave active rectifiers 12002, the sub-capacitors 12005, diodes D1, D4 in sub-full-wave active rectifiers 12001, the sub-capacitors 12004, diodes D1, D4 in sub-full-wave active rectifiers 12000, the sub-capacitors 12003.

Figure 14C:
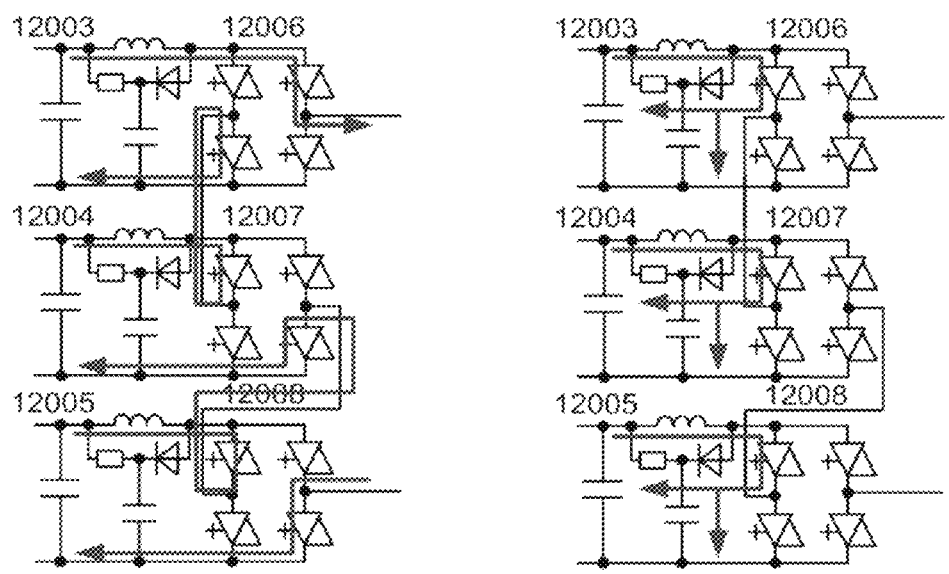
FIG. 14C shows the operation of the full-wave active inverter according to an embodiment of present invention.

Again, phase-A full-wave active inverters 12006, 12007, 12008 is taken as an example. FIG. 14C left shows the operation of the full-wave active inverter according to an embodiment of present invention, is how to produce the maximal output. And for other states they are similar with one power conversion module as described above. FIG. 14C right shows the operation of the clamp circuit between the switched-on state and the switched-off state.

In similar manner as described above, the phase power converter may be extended to even more power conversion modules linked in cascade. For a given voltage across the DC-link capacitor used in the phase power converter, the required value of the breakdown voltage for the power devices used therein will decrease with the extension.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A wind power converter, comprising:
   a multiple of phase power converters, each of which being adapted to convert power output from a corresponding phase of a wind generator to a corresponding phase of a grid;
   each of the phase power converters comprising:
   a full-wave rectifier, being adapted to rectify the power input through a first terminal and a second terminal from the corresponding phase of the wind generator;
   a capacitor being adapted to be charged by the power rectified by the full-wave rectifier; and
   a full-wave active inverter, being adapted to invert the power stored in the capacitor and output the inverted power to the corresponding phase of the grid through a third terminal and a fourth terminal;
   wherein:
   the first terminal or the second terminal is connected to a first virtual neutral; and
   the third terminal or the fourth terminal is connected to a second virtual neutral.

2. The wind power converter according to claim 1, further comprising:
   a multiple of first inductors, which are arranged to be respectively connected between each of the phase power converters and the corresponding phase of the wind generator;
   wherein:
   the full-wave rectifier is a full-wave active rectifier, further comprising power switches, each of which is connected with each of diodes of the full-wave rectifier in anti-parallel.

3. The wind power converter according to claim 2, wherein:
   the full-wave active rectifier works in a rectification mode where each of the power switches is off so that the corresponding capacitor is charged by the power output from the corresponding phase of the wind generator.

4. The wind power converter according to claim 2, wherein:
   the full-wave active rectifier comprises four diodes and four power switches.

5. The wind power converter according to claim 2, wherein:
the full-wave active rectifier works in phase-I of boost mode where one of the power switches is on and the other power switches are off so that the first inductor is charged by the power output from the corresponding phase of the wind generator; and
the full-wave active rectifier works in phase-II of boost mode where each of the power switches is off so that the capacitor is charged by the power output from the corresponding phase of the wind generator and the power stored in the corresponding first inductor.

6. The wind power converter according to claim 1, wherein:
the full-wave rectifier comprises a multiple of sub-full-wave rectifiers in a cascade, wherein each of the sub-full-wave rectifiers comprises four.

7. The wind power converter according to claim 2, wherein:
the full-wave active rectifier comprises a multiple of sub-full-wave active rectifiers in a cascade, wherein each of the sub-full-wave active rectifiers comprises four diodes and four power switches anti-parallel connected therewith;
the sub-full-wave active rectifier works in phase-I of boost mode where in each of the sub-full-wave active rectifiers one of the power switches is on and the other power switches are off so as to charge the corresponding first inductor;
the sub-full-wave active rectifier works in phase-II of boost mode where each of the power switches is off so that the capacitor is charged by the power output from the corresponding phase of the wind generator and the power stored in the corresponding first inductor.

8. The wind power converter according to claim 2, wherein:
the full-wave active inverter comprises a multiple of sub-full-wave active inverters in a cascade, wherein each of the sub-full-wave active inverters comprises four diodes and four power switches.

9. The wind power converter according to claim 2, wherein:
the capacitor comprises a multiple of sub-capacitors, being adapted to be charged by the power rectified by the corresponding sub-full-wave-active rectifier; and
the full-wave active inverter comprises a multiple of sub-full-wave active inverters corresponding to the multiple of sub-capacitors, the sub-full-wave active inverter being adapted to invert the power stored in the corresponding sub-capacitor.

10. The wind power converter according to claim 9, wherein:
the sub-full-wave active inverter and the corresponding sub-capacitor are connected with each other through two terminals.

11. The wind power converter according to claim 1, further comprising:
a set of input filter, which are arranged to be respectively connected between each of the phase power converters and the corresponding phase of the wind generator;
a set of output filter, which are arranged to be respectively connected between each of the phase power converters and the corresponding phase of the grid.

* * * * *